United States Patent [19]

Masselink

[11] Patent Number: 5,214,856
[45] Date of Patent: Jun. 1, 1993

[54] SCREW THREAD MEASURING DEVICE
[75] Inventor: John Masselink, Zeeland, Mich.
[73] Assignee: Morse Hemco Corporation, Holland, Mich.
[21] Appl. No.: 887,146
[22] Filed: May 21, 1992
[51] Int. Cl.[5] ................................. G01B 3/48
[52] U.S. Cl. ................................. 33/199 R
[58] Field of Search .................. 33/199 R, 199 B, 829

[56] References Cited
U.S. PATENT DOCUMENTS

| | | |
|---|---|---|
| 1,307,347 | 6/1919 | Cumner . |
| 1,357,813 | 11/1920 | Olson . |
| 1,359,943 | 11/1920 | Wilhelm . |
| 2,025,215 | 12/1935 | Munn . |
| 2,432,160 | 12/1947 | Johnson ............. 33/199 R |
| 2,547,681 | 4/1951 | Aller . |
| 2,763,068 | 9/1956 | Starbuck . |
| 2,789,361 | 4/1957 | Schmittke . |
| 3,237,312 | 3/1966 | Boppel . |
| 3,504,441 | 4/1970 | Linley et al. . |
| 3,683,509 | 8/1972 | Kurz . |
| 3,796,493 | 3/1974 | Yamamoto et al. . |
| 3,812,591 | 5/1974 | Michaud . |
| 3,816,934 | 6/1974 | Johnson . |
| 3,844,046 | 10/1974 | Johnson . |
| 3,859,730 | 1/1975 | Johnson . |
| 3,879,854 | 4/1975 | Johnson . |
| 4,521,971 | 6/1985 | Mayer . |
| 4,544,268 | 10/1985 | Yamada et al. . |
| 4,586,261 | 5/1986 | Beaupére . |
| 4,989,331 | 2/1991 | Dodge ............. 33/199 R |
| 5,020,230 | 6/1991 | Greenslade ............. 33/199 R |

FOREIGN PATENT DOCUMENTS 1623208  1/1971  Fed. Rep. of Germany .

OTHER PUBLICATIONS

AMBICORD brochure.
Johnson Gage Screw Thread Measurement Systems.

Primary Examiner—Harry N. Haroian
Attorney, Agent, or Firm—Varnum, Riddering, Schmidt & Howlett

[57] ABSTRACT

A screw thread measuring device capable of measuring the physical parameters of internally or externally threaded parts comprising a base and slidable platform. Measuring segments are mounted to the base and platform, respectively. Gage mounts to the base and contacts the platform with plunger. To measure an externally threaded part, the externally threaded part is placed between base mounted measuring segments and platform mounted segment. The measuring segments are biased together. Plunger of the gage correspondingly moves with the platform to measure the displacement of the platform with respect to the base. The distance the platform moves is read out on the dial of gage. To measure an internally threaded part, the measuring segments are replaced with measuring segments designed for internally threaded parts. The threaded parts are inserted into the internally threaded part and the platform is biased away from base mounted segment.

19 Claims, 5 Drawing Sheets

SCREW THREAD MEASURING DEVICE

BACKGROUND OF THE INVENTION

1. Field of the Invention

This invention relates to an apparatus for measuring the physical properties of internally and externally threaded parts, and more specifically, to an apparatus which measures the threaded part by comparing the threaded part against a known standard and displaying the difference between the part and the standard.

2. Description of the Related Art

Screws and bolts are routinely tested for function and pitch to determine whether the screws are within tolerance limits in a specification. Due to wear of cutting tools, these measurements during the manufacturing process can change over a period of time. Thus, screws and bolts must be continually tested to ensure that the screws and bolts conform to specifications. Typically, screw thread measuring devices measure only two parameters: the pitch diameter and the functional diameter of the parts. These measurements provide the best indication of whether or not the part is within the desired tolerance. The pitch diameter is defined as the diameter of the pitch cylinder for a straight thread. For a taper thread, the pitch diameter, at a given position on the thread axis, is the diameter of the pitch cone at that position. For a single-start thread of perfect form and lead, it is also the length between intercepts of a line which is perpendicular to the thread axis and intersects thread flanks on opposite sides of the thread axis. The functional diameter of an internal or external thread is the pitch diameter of the enveloping thread of perfect pitch, lead, and flank angles, having full depth of engagement but clear at crests and roots, and of a specified length of engagement. It may be derived by adding to the pitch diameter in the case of an external thread, or subtracting from the pitch diameter in the case of an internal thread, the cumulative effects of deviations from specified profile, including variations in lead and flank angle over a specified length of engagement. The effects of taper, out-of-roundness, and surface defects may be positive or negative on either external or internal threads.

Generally, there are two ways to measure the physical parameters. First, a threaded part is compared to a standard and the difference between the standard and the part appears on a display. Second, this measurement is compared to the required dimensions. When measuring an externally threaded part, the part is generally placed between two contacts which are biased against the part. The displacement of the contacts as they are pressed against the part causes a displacement in a mechanical or electrical gage, resulting in a read-out on the dial of a mechanical gage or the display of an electrical gage which represents the difference between the part and the standards. If the difference is within the desired tolerance, the threaded part is acceptable and no modification is made to the manufacturing process.

Heretofore, there were separate devices which measure only one physical parameter either the pitch diameter or functional diameter for internal or external threads. The disadvantage of these devices is that separate devices for each type of measurement for internally and externally threaded parts are required. Four separate devices are required if it is desired to measure the pitch diameter and functional diameter for both internally and externally threaded parts. This requirement significantly increases the cost by requiring the purchase of four separate devices.

U.S. Patent Nos. 3,844,046 and 3,879,854 disclose apparatuses which measure the pitch diameter and functional diameter, but only for externally threaded parts. These thread measuring devices increase cost and have limited versatility because they are incapable of measuring both the pitch diameter and functional diameter of both internally and externally threaded parts on a single thread measuring device, resulting in the need for separate thread measuring devices to measure pitch diameter and functional diameter for both internal and external threads.

The U.S. patent to Beaupere, U.S. Pat. No.4,586,261, discloses a gage capable of measuring both internally and externally threaded parts. However, Beaupere, requires switching components to measure the pitch diameter or functional diameter which reduces operating convenience as the pitch diameter and functional diameter are often used in combination to determine if the threaded part is within a desired tolerance.

SUMMARY OF THE INVENTION

A screw thread measuring device capable of measuring the physical parameters of both internally and externally threaded parts, including the pitch diameter and functional diameter, comprises a base having opposed sides, opposed ends and an upper surface. The upper surface has an opening defined therein. A pair of fixed parallel shafts are fixably mounted to the base. A platform is disposed within the opening on the upper surface of the base and is slidably mounted to the pair of shafts so that the platform can slide within the opening in the upper surface of the base. Mounted to the base is a first measuring segment. Mounted to the slidable platform is a second measuring segment which is complementary and in registry with the first measuring segment. At least one gage is mounted to the base. The gage is connected to the platform and measures the movement of the platform with respect to the base.

In one embodiment, at least one bearing for each fixed shaft slidably mounts each fixed shaft to the platform.

In another embodiment, a biasing device biases the platform either away from or toward the first measuring segment. Preferably, the platform has slotted openings for mounting the bearings. The slotted openings further have two set screws for adjusting the bearings to prevent the fixed shafts and bearings from binding.

Preferably, the biasing device is a central shaft which passes through the platform and is mounted to the base so that the central shaft can move axially. The central shaft has a pair of springs and each spring is disposed on opposite sides of the platform with one end of each spring abutting the platform. A pair of opposed stop pins are mounted on opposite sides of the platform and limit the movement of the platform with respect to the base.

In a further embodiment, the first and second measuring segments are mounted to the base and the platform, respectively, by a base mounting bracket and a platform mounting bracket, respectively. Preferably, the first measuring segment and the second measuring segment are pivotally mounted to the base mounting bracket and the platform mounting bracket, respectively. The upper surface of the platform is preferably coplanar with the upper surface of the base.

In another embodiment, a third measuring segment is mounted to the base and a fourth measuring segment, which is complementary and in registry to the third measuring segment, is mounted to the platform. Preferably, the first and second measuring segments measure the functional diameter and the third and fourth measuring segments measure the pitch diameter, providing for rapidly switching from one measurement to the other.

BRIEF DESCRIPTION OF THE DRAWINGS

The invention will now be described with reference to the drawings in which.

DETAILED DESCRIPTION OF THE PREFERRED EMBODIMENTS

Figure 1:
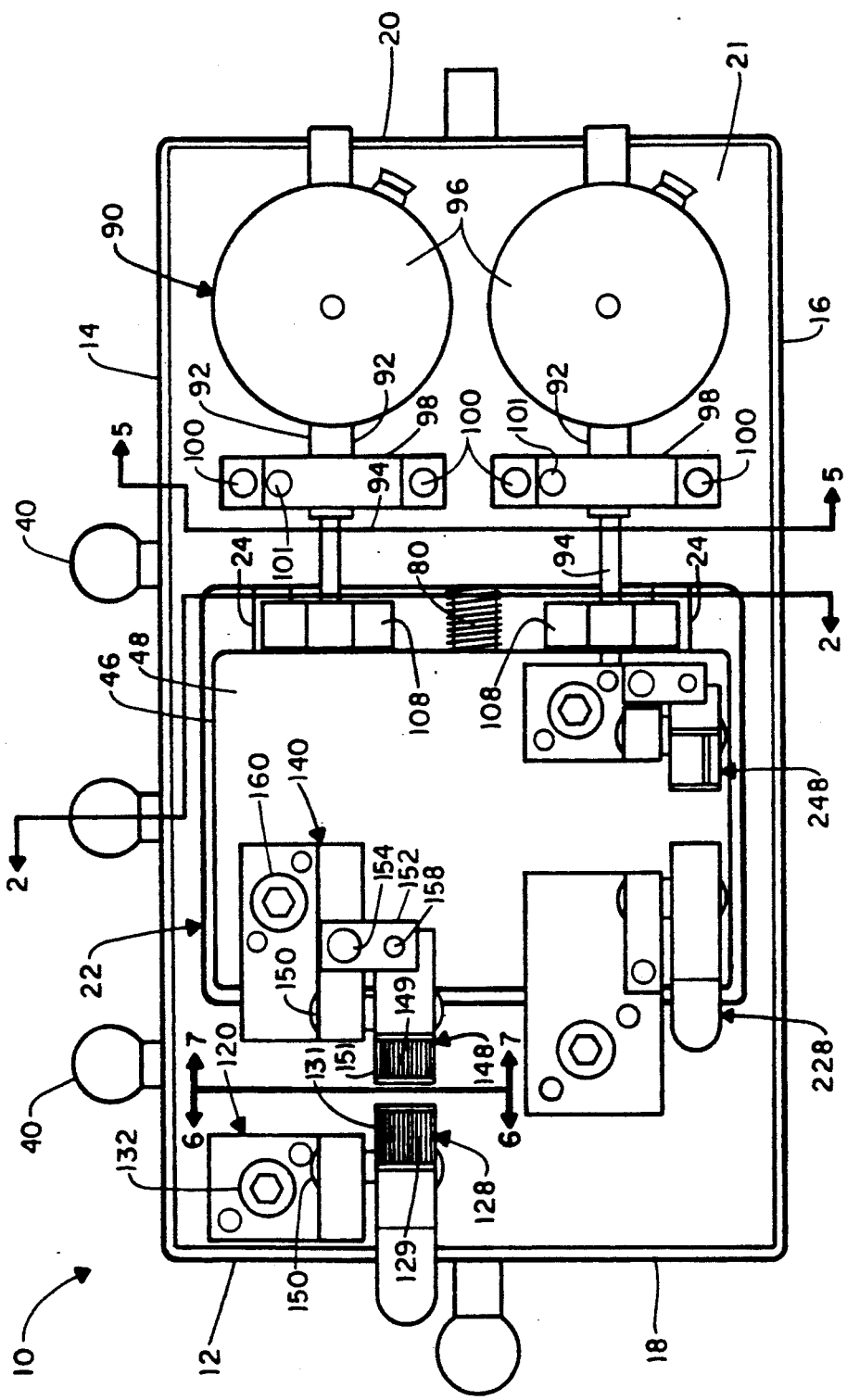
FIG. 1 illustrates a plan view of a screw thread measuring device according to the invention.

FIG. 1 illustrates a screw thread measuring device 10 according to the invention. The screw thread measuring device 10 comprises base 12 and slidable platform 46. Gages 90 and measuring segment 128 and 228 mount to the base 12. Measuring segments 148 and 248 mount to the slidable platform 46. Measuring segments 128 and 148 are complementary and paired as are measuring segments 228, 248 for measuring the physical characteristics of externally threaded parts. However, paired segments which measure externally threaded parts can easily replace the paired segments 128, 148 and 228, 248.

For purposes of this disclosure, the screw thread measuring device 10 is shown as having two gages 90 and two pairs of complementary segments 128, 148 and 228, 248 for measuring both the functional diameter and pitch diameter of threaded parts, respectively. However, it is understood that the screw thread measuring device 10 could have only one or several gages and a corresponding number of paired segments.

Figure 2:
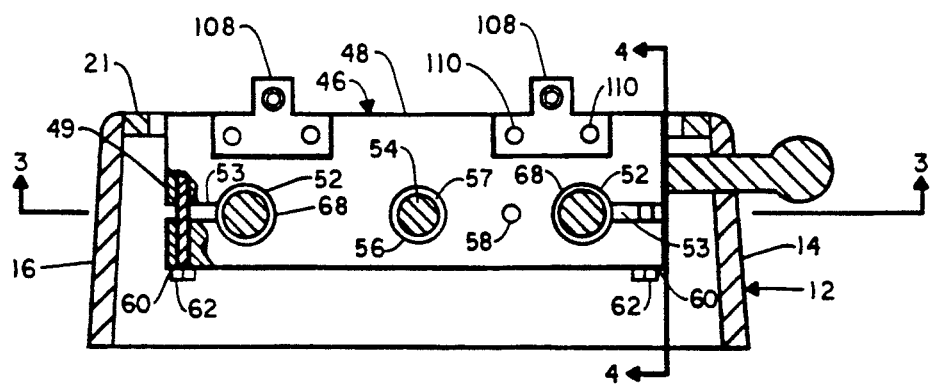
FIG. 2 is a sectional view along line 2—2 of FIG. 1.
Figure 3:
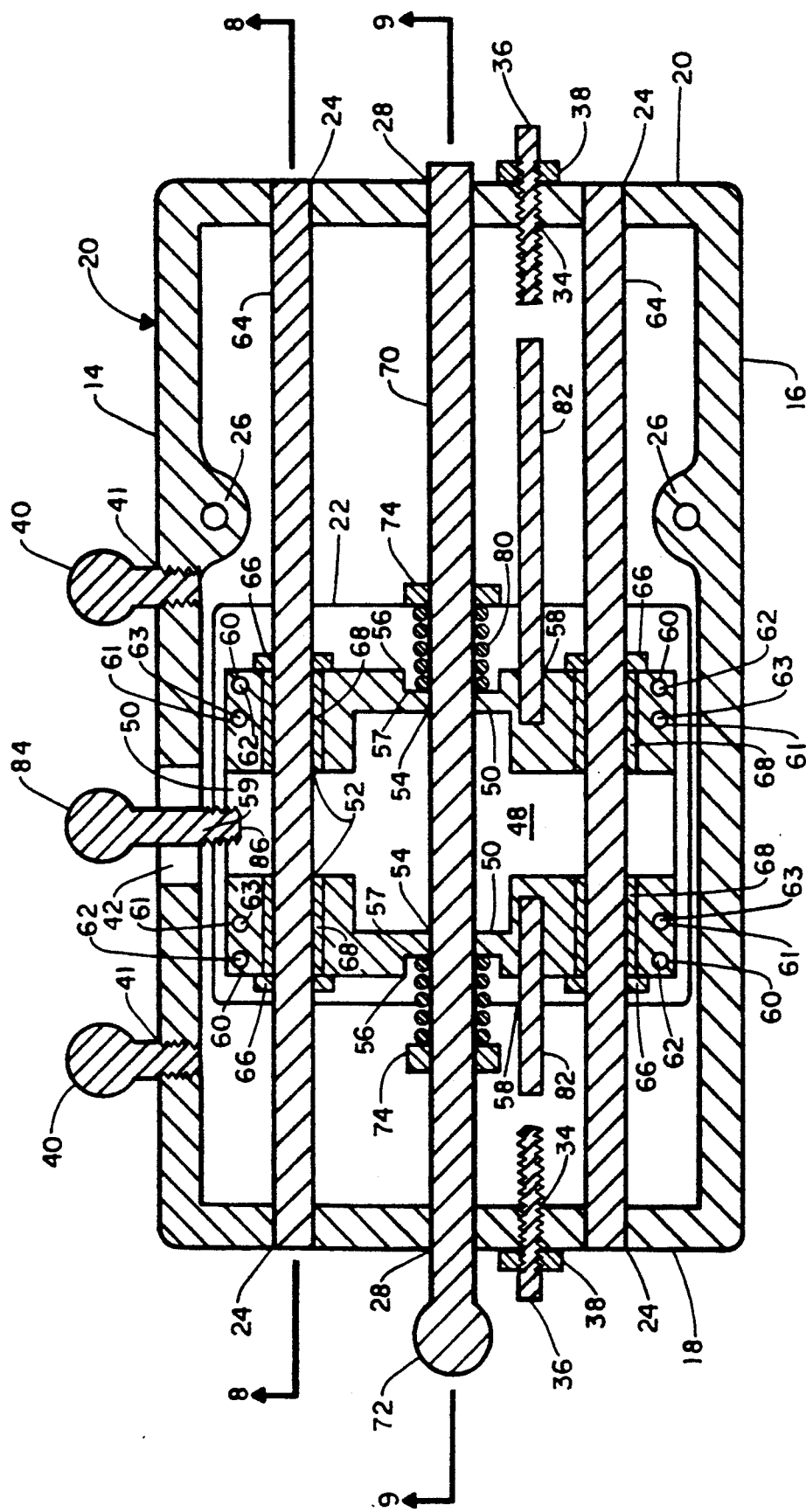
FIG. 3 is a sectional view, partially cut away, along line 3—3 of FIG. 2.

Referring now to FIGS. 1-2, the base 12 is generally rectangular in shape and has opposed sides 14, 16 opposed ends 18, 20 and upper surface 21. A platform opening 22 is defined in the upper surface 21 of the base 12. Referring to FIG. 3, precision shaft openings 24 are defined within the ends 18 and 20 of the base 12. Stand mounts 26 extend from the sides 14 and 16. Central shaft openings 28 are defined within the ends 18, 20. Tapped hole 30 extends from the bottom edge of end 20 and into the central shaft opening 28. Tapped opening 34 is defined within ends 18 and 20. Stationary ball grips 40 are disposed on opposite sides of the oval shaped opening 42 on side 14 of the base 12 and thread into tapped holes 41.

Figure 4:
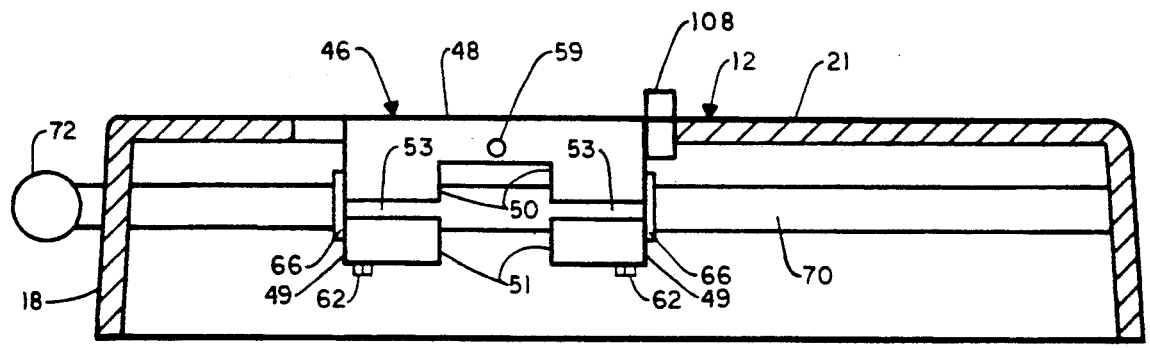
FIG. 4 is a sectional view along line 4—4 of FIG. 2.

Referring now to FIGS. 2-4, the slidable platform 46 comprises an upper surface 48 and extensions 49. Extensions 49 have an upper arm 50 and lower arm 51 which define the slotted shaft opening 52 having slot 53. A central shaft bore 54 is disposed between the slotted shaft openings 52 on each extension 49. Each central shaft bore 54 has a counter bore 56 which defines a flange 57. A stop pin opening 58 is disposed between the slotted shaft opening 52 and central shaft bore 54 on the extensions 49. For each slotted shaft opening 52, a tapped hole 60 extends through the lower arm 51 and upper arm 50 of the slotted shaft opening 52. A tapped hole 60 extends through the bottom of the platform 46 into the slotted shaft opening 52.

One side of the upper surface 48 of the slidable platform 46 has a tapped hole 86 for receiving an adjusting knob 84. T-shaped plunger stops 108 are mounted to the end of the upper surface 48 of the slidable platform 46 directly above the precision shaft openings 52.

Referring to FIG. 3, the stop pins 82 are mounted into the stop pin openings 58 of the slidable platform 46. The stop pins 82 are in alignment with the socket head set screws 36 which are threaded into the tapped openings 34 of the ends 18, 20 of the base 12. The socket head set screws 36 can be locked in place by jam nut 38 which threadably engages the set screw 36. The stop pins 82 in combination with the set screws 36 provide for limiting the longitudinal range of movement of the slidable platform 46. The set screws 36 are adjusted to their desired position and then locked in place by the jam nut 38. As the slidable platform 46 is moved towards the desired limits, the stop pin 82 will contact either of the set screws 36, preventing further movement of the slidable platform 46.

Figure 5:
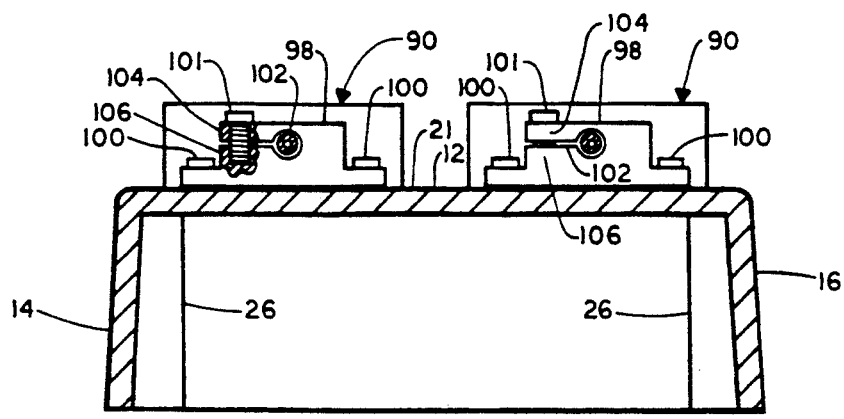
FIG. 5 is a sectional view along line 5—5 of FIG. 1.

Referring to FIGS. 1 and 5, gages 90 comprise a cylindrical barrel 92, spring-biased plunger 94 and dial 96. The spring-biased plunger 94 is connected to the dial 96 and extends outwardly through the barrel 92. Gage Mounting blocks 98 mount the gages to the upper surface 21 of the base 12 and comprise base 106 and upper arm 104 which define the slotted opening 102. Tapped hole 103 extends through the upper arm 104 and into the base 106. Although gages 90 are shown as analog dial gages, other types of gages for measuring the movement of the platform 46, including electronic gages with digital displays, are within the scope of the invention.

Figure 6:
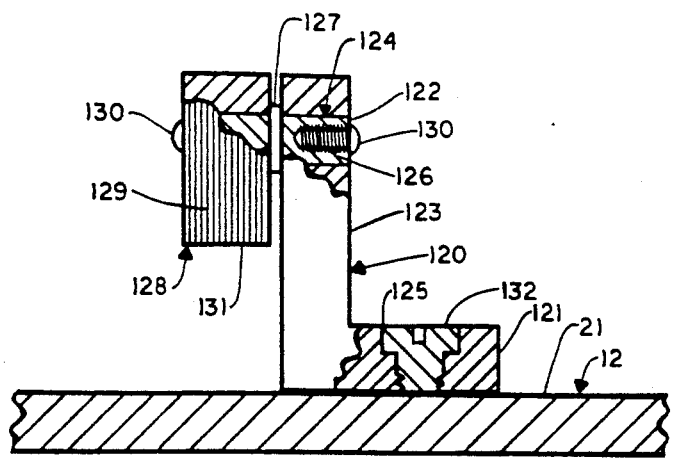
FIG. 6 is a partial sectional view along line 6—6 of FIG. 1.
Figure 7:
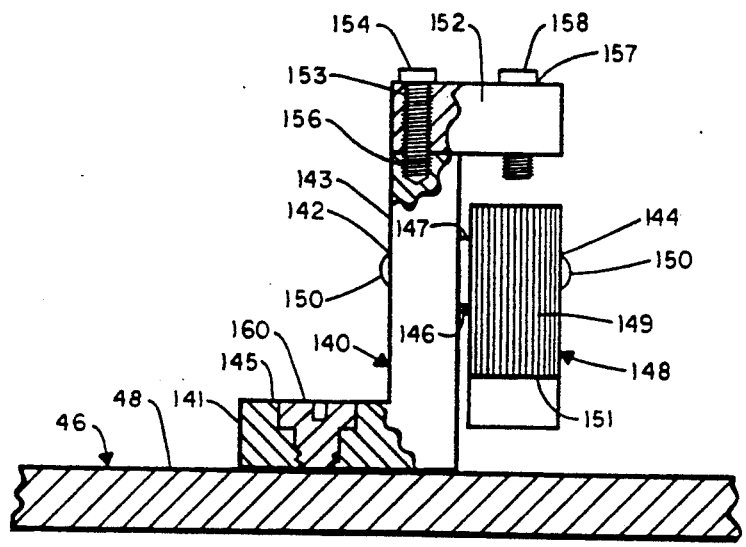
FIG. 7 is a partial sectional view along line 7—7 of FIG. 1.

Referring to FIG. 1, 6 and 7, base measuring segments 128, 228 are complementary to and the mirror image of platform measuring segments 148, 248, respectively. The complementary measuring segment pairs 128, 148 and 228, 248 are identical except that segment pair 128, 148 has a plurality of threads 129, 149 along their curved face 131 for measuring the functional diameter and the pair 228, 248 has only a single thread 229, 249 for measuring the pitch diameter. Only the more complicated pair 128, 148 will be described. The description will generally apply to pair 228, 248. The base mounting blocks 120, 220 are similar as are the platform mounting blocks 140, 240 and only the base mounting blocks 120 and platform mounting blocks 140 will be discussed.

The measuring segments 128 and 148 have segment openings 124 and 144, respectively. The curved faces 131, 151 have threads 129, 149. Preferably, the segment openings 124 and 144 are forward of the center of gravity of the measuring segments 128, 148, providing for the curved faces 131, 151 to tilt upwardly when not in use, simplifying the insertion of a part between the measuring segments 128, 148. The base mounting block 120 and platform mounting block 140 are L-shaped and comprise lower arms 121, 141 and upper arms 123, 143, respectively. Lower arms 121, 141 have drilled and counterbored holes 125, 145, respectively. Upper arms 123, 143 have segment openings 124, 144, respectively. Only the platform mounting block 140 has stop bar 152 which has a drilled hole 153 which aligns with the tapped hole 156 of the upper arm 143. The stop bar 152 has a second tapped hole 157 which receives a stop screw 158.

The dimensions of the lower arm 121, 141 and upper arms 123, 143 of the base mounting blocks 120 and platform mounting block 140 will vary depending on the location of the mounting blocks on the surface of the base 12 or platform 46. Preferably, the dimensions are such that the measuring segments are close enough to provide for holding a part between the measuring segments.

Figure 8:
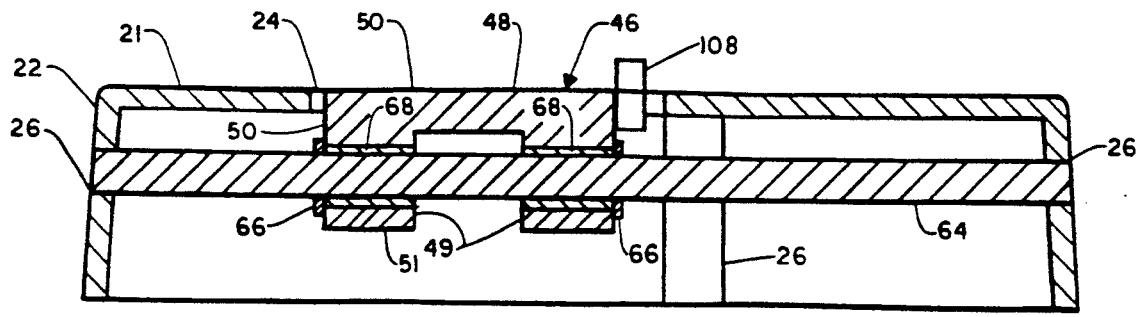
FIG. 8 is a sectional view along line 8—8 of FIG. 3.

Referring now to FIGS. 2, 3 and 8, the slidable platform 46 is slidably connected to the base 12 by precision shafts 64 and bearings 68. The bearings 68 are inserted into the slotted shaft openings 52 of the slidable platform 46. The precision shafts 64 are then slidably mounted into the precision bearings 68 and the ends of the precision shaft 64 are press-fitted into the precision shaft openings 24 on the ends 18, 20 of the base 12, providing for the slidable platform 46 to slide longitudinally along the precision shafts 64. The bearings 68 are retained in place by retaining rings 66 and by cap screw 62 and set screw 63. Cap screw 62 and set screw 63 further provide for adjusting the bearings 68 to prevent binding of the shaft and the bearing 68 (FIGS. 2, 4 and 8). Cap screw 62 draws together the upper arm 50 and lower arm 51 of the slotted shaft opening 52 as it is tightened, pinching the bearing 68 between the arms 50, 51. Set screw 63 contacts the upper surface of slot 53. By adjusting screws 62 and 63, the desired pressure is placed upon the bearing 68 to prevent it from binding with the precision shafts 64.

Figure 9:
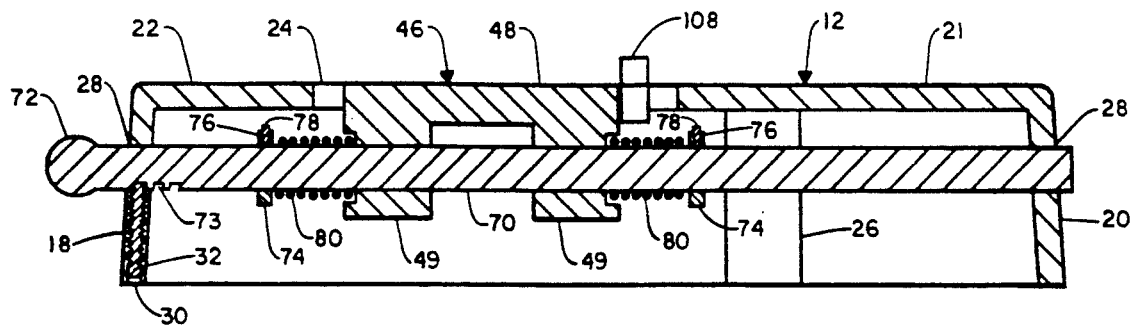
FIG. 9 is a sectional view along line 9—9 of FIG. 3.

Referring to FIGS. 3 and 9, the central shaft 70 is slidably mounted into the central shaft openings 28 on the ends 18, 20 of the base 12 and through the central shaft bore 54 in the extensions 49 of the slidable platform 46. Springs 80 are mounted onto the central shaft 70 between shaft collars 74 and flange 57. Shaft collars 74 are mounted to the central shaft 70 and are held in place by set screws 78 passing through the set screw opening 76. One end of the spring 80 abuts the shaft collars 74 and the other end of the spring 80 is positioned within the counter bore 56 and abuts the flange 57. One end of the central shaft 70 has notches 73 disposed on the lower surface of the shaft collar 74. The notches 73 are complementary in shape with the set screw 32 and provide for fixing the central shaft 70 in a predetermined position by engaging the set screw 32 with the notches 73. Preferably, there are at least three notches 73 which provide for positioning the central shaft 70 in such a manner that the slidable platform 46 is properly biased depending on whether internally or externally threaded parts are measured.

Referring to FIGS. 1 and 5, the gages 90 are mounted to the upper surface 21 of the base 12 by gage mounting blocks 98. The gage mounting block 98 is mounted to the upper surface 21 of the base 12 by cap screws 100. The gage 90 is mounted to the gage mounting block 98 by inserting the barrel 92 through the slotted opening 102 and tightening the cap screw 101, causing the upper arm 104 to hold the barrel 92 in compression between the upper arm 104 and the base 106. The gage mounting blocks 98 are positioned on the upper surface 21 of the base 12 in such a manner that after the gage 90 is mounted to the gage mounting blocks 98, the plunger 94 of the gage 90 will align with and contact the plunger stop 108 mounted to the upper surface 48 of the slidable platform 46. The plunger 94 is biased against the plunger stop 108, thus transferring any longitudinal movement of the platform 46 to the gage 90 by the plunger 94.

Referring to FIGS. 1, 6 and 7, the paired measuring segments 128 and 148 are mounted to the base 12 and slidable platform 46, respectively, by base mounting block 120 and platform mounting block 140, respectively. Both segments 128, 148 are similarly rotatably mounted to their respective mounting blocks 120, 140, by a flanged mounting pin 126, 146, one end of which is mounted into the mounting block opening 122 and the other end of which is mounted into the segment opening 124. The flanges 127, 147 of the flanged mounting pins 126, 146 space the measuring segments 128, 148 from the mounting blocks 120, 140. Cap screws 130, 150 screw into the ends of the flanged mounting pins 126, 146, securing the flanged mounting pins 126, 146 to the mounting blocks 120, 140 and the measuring segments 128, 148 to the flanged mounting pins 126, 146. The mounting blocks 120, 140 are fastened to the base 12 and slidable platform 46 by cap screws 132, 160. The measuring segments 128, 148 can pivot about the flanged mounting pins 126, 146.

The stop 152 is mounted to the platform mounting block 140 so that one end of the stop 152 is disposed over the segment 148. An adjustment screw 158 is threadably mounted through the stop 152, providing for adjustment of the upper stopping limit of the segment 148 as it pivots about the flanged mounting pin 146.

FIGS. 6 and 7 disclose complementary segments 128 and 148 used for measuring externally threaded parts. However, the segments 128 and 148 are easily replaced by other segments capable of measuring internally threaded parts such as those shown in FIGS. 10 and 11

Figure 10:
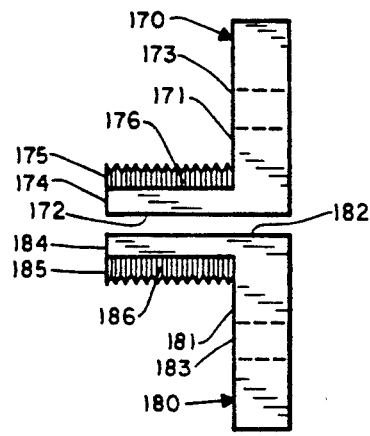
FIG. 10 illustrates an alternate functional diameter measuring segment for internally threaded parts.

FIG. 10 illustrates measuring segments 170, 180 for measuring the functional diameter of internally threaded parts. The paired measuring segments 170, 180 are substantially identical and mirror images of each other. The measuring segments 170, 180 are generally L-shaped and have first arms 171, 181 and second arms 172, 182, respectively. First arms 171, 181 have segment openings 173, 183. Second arms 172, 182 have flat surfaces 174, 184 and curved surfaces 175, 185. Curved surfaces 175, 185 have a plurality of threads 176, 186. Measuring segments 170, 180 are mounted to the base 12 and platform 46.

Figure 11:
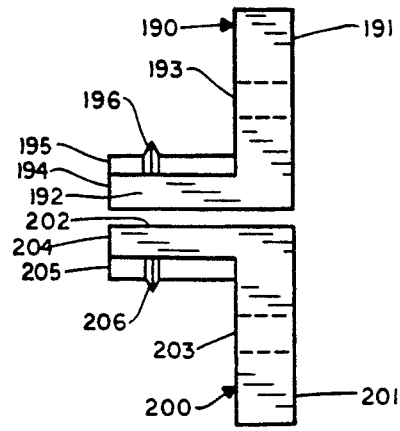
FIG. 11 illustrates an alternate pitch diameter measuring segment for internally threaded parts.

FIG. 11 illustrates paired measuring segments 190, 200 for measuring the pitch diameter of internally threaded parts. The measuring segments 190, 200 are substantially identical to measuring segments 170, 180 in that measuring segments 190, 200 comprise first arms 191, 201, second arms 192, 202 and segment openings 193, 203. The second arms 192, 202 have flat surfaces 194, 204 and curved surfaces 195, 205. However, curved surfaces 195, 205 only have one thread 196, 206 for measuring the pitch diameter internally threaded parts. Paired measuring segments 190, 200 replace paired measuring segments 228, 248 in the same way as paired measuring segments 170, 180 replace paired measuring segments 128, 148. The measuring segments 170, 180 are mounted to the base 12 and platform 46 by mounting blocks similar to mounting blocks 120, 140 except that the mounting pins 126, 146 are replaced with cap screws and the first arms 171, 191 rest in a slot (not shown) in the upper arm of the mounting blocks, rigidly fixing the position of the measuring segments 170, 180.

In the preferred embodiment, two gages are used and two pairs of complementary segments are mounted to the base and platform, one pair of complementary segments preferably measures the functional diameter of the screw and the other pair of complementary segments measures the pitch diameter of the screw.

In operation, if an externally threaded part is measured, it is necessary to first bias the platform 46 towards the base mounted segments 128 by moving the central shaft 70 to the notch 73 farthest away from the knob 72 and locking the central shaft 70 in place by the set screw 32. In this biased position, the measuring segments mounted on the base 12 and platform 46 are close enough to prevent insertion of a part between the segments 128 and 148. The measuring segments 128 and 148 are separated by grasping the adjusting knob 84 and moving the platform 46 a sufficient distance along the precision shafts 64 to provide for inserting the part between the complementary segments 128 and 138. The operator can easily move the slidable platform by gripping one of the stationary ball grips 40 and the platform adjustment knob 84 in one hand and squeezing.

Prior to measuring a part, a known standard is placed between the complementary segments 128 and 148 and the gages 90 are zeroed according to the standard. Therefore, any difference between the standard and the measured part will longitudinally displace the platform which will equally displace the gage plunger, providing a reading on the gage dial. Thus, the difference between the part and the standard can easily be read on the gage 90.

After the gages are zeroed, the part is placed between the complementary segments 128 and 148 by first squeezing together one of the stationary ball grips 40 and adjustment knob 84 to separate the segments 128, 148 and then placing the part between the separated measuring segments. The operator then releases the ball grip 40 and platform adjustment knob 84. The spring 80 biases the platform 46 toward the base mounted segments 128, thereby longitudinally displacing the gage plungers. The gages 90 display any differences between the part and the standard.

Preferably the pitch diameter is measured first. If it is within the desired limits, the functional diameter is then measured by removing the part from the complementary segments 228 and 248 for the pitch diameter and placing the part between the complementary segments 128, 148. The measurement process is repeated.

If internally threaded parts are measured, it is necessary to replace the complementary parts 128, 148 and 228, 248 with parts specifically designed for measuring internal threads such as those illustrated in FIGS. 10 and 11. Further, it is also necessary to bias the platform 46 away from the base mounted segments 128, 228 so the measuring segments are pressed against the sides of the internally threaded part after the measuring segments are inserted into the part.

The platform 46 is biased away from the base mounted segments 128 by moving the central shaft until the notch 73 closest to the knob 72 is disposed over the set screw 32. The set screw 32 is tightened into abutting relationship with the central shaft 70. After adjusting the platform bias, the internally threaded parts are measured in the same manner as the externally threaded parts.

Advantageously, the screw thread measuring device is capable of measuring both the functional diameter and pitch diameter in rapid sequence by mounting two sets of paired measuring segments to the screw thread measuring device. Further, the measuring segments are easily interchangeable, providing for easily modifying the screw thread measuring device to measure either internally or externally threaded parts by mounting the desired measuring segments on the screw thread measuring device. Even further, the fixed parallel precision shafts provide for the platform to move over a great distance relative to the tolerances measured. The great range of movement in the platform provides for measuring parts over a very broad range of sizes.

Reasonable variation and modification are possible within the spirit of the foregoing specification and drawings without departing from the scope of the invention.

I claim:

1. A screw thread measuring device capable of measuring two physical parameters of both internally and externally threaded parts, the screw thread measuring device comprising:
    a base comprising opposed sides, opposed ends and an upper surface, the upper surface having an opening;
    a pair of fixed shafts, parallel to each other, fixedly mounted to the base;
    a platform disposed within the opening on the upper surface of the base and slidably mounted to the pair of shafts, so that the platform can slide within the opening in the upper surface of the base;
    a first pair of measuring segments comprising a first measuring segment mounted to the base and a second measuring segment, complementary to the first measuring segment and mounted to the platform in registry with the first measuring segment for measuring a first physical parameter of a threaded part;
    a second pair of measuring segments comprising a third measuring segment mounted to the base and a fourth measuring segment, complementary to the third measuring segment and mounted to the platform in registry with the third measuring segment for measuring a second physical parameter of a threaded part;
    a first gage mounted to the base for displaying a first physical parameter measurement associated with the first pair of measuring segments;
    a second gage mounted to the base for displaying a second physical parameter measurement associated with the second pair of measuring segments; and
    a connection between each of the first and second gages and the platform for measuring the movement of the platform with respect to the base.

2. A screw thread measuring device according to claim 1 and further comprising at least one bearing for each fixed shaft for slidably mounting the platform to each fixed shaft.

3. A screw thread measuring device according to claim 2 and further comprising a biasing device for biasing the platform either away from or toward the first measuring segment.

4. A screw thread measuring device capable of measuring the physical parameters of both internally and externally threaded parts, including the pitch diameter and functional diameter, the screw thread measuring device comprising:

a base comprising opposed sides, opposed ends and an upper surface, the upper surface having an opening;

a pair of fixed shafts, parallel to each other, fixedly mounted to the base;

a platform disposed within the opening on the upper surface of the base and slidably mounted to the pair of shafts, so that the platform can slide within the opening in the upper surface of the base;

at least one bearing for each fixed shaft for slidably mounting the platform to each fixed shaft and the platform has slotted openings for mounting the bearings, and fasteners in the slotted openings for adjustably fixing the position of the bearings with respect to the platform to prevent the fixed shafts and bearings from binding;

a first measuring segment mounted to the base;

a second measuring segment, complementary to the first measuring segment and mounted to the platform in registry with the first measuring segment;

a biasing device for biasing the platform either away from or toward the first measuring segment;

a gage mounted to the base; and a connection between the gage and the platform for measuring the movement of the platform with respect to the base.

5. A screw thread measuring device according to claim 4 wherein the biasing device comprises a central shaft passing through the platform and mounted to the base for axial movement, the shaft having a pair of springs, each spring disposed on opposite sides of the platform with one end of each spring abutting the platform.

6. A screw thread measuring device according to claim 5 and further comprising a pair of opposed stop pins, each stop pin is mounted on opposite sides of the platform for limiting the movement of the platform with respect to the base.

7. A screw thread measuring device according to claim 6 and further comprising a base mounting bracket for removably mounting the first measuring segment to the base.

8. A screw thread measuring device according to claim 7 wherein the first measuring segment is pivotally mounted to the base through the base mounting bracket.

9. A screw thread measuring device according to claim 8 and further comprising a platform mounting bracket for removably mounting the second measuring segment to the platform.

10. A screw thread measuring device according to claim 9 wherein the second measuring segment is pivotally mounted to the platform through the platform mounting bracket.

11. A screw thread measuring device according to claim 10 wherein the platform has an upper surface which is coplanar with the upper surface of the base.

12. A screw thread measuring device according to claim 11 and further comprising a third measuring segment mounted to the base; and a fourth measuring segment, complementary to the third measuring segment and mounted to the platform in registry with third measuring segment.

13. A screw thread measuring device according to claim 12 wherein the first and second measuring segments are adapted to measure the functional diameter and the third and fourth segments are adapted to measure the pitch diameter, whereby both the functional diameter and pitch diameter of a threaded part can be measured on the same instrument in rapid sequence.

14. A screw thread measuring device according to claim 13 and further comprising a second gage mounted to the base and a connection between the platform and the second gage for measuring the movement of the platform with respect to the base.

15. A screw thread measuring device according to claim 1 wherein the first physical parameter is the functional diameter.

16. A screw thread measuring device according to claim 1 wherein the second physical parameter is the pitch diameter.

17. A screw thread measuring device according to claim 1 wherein the first physical parameter is the functional diameter and the second physical parameter is the pitch diameter.

18. A screw thread measuring device capable of measuring the physical parameters of both internally and externally threaded parts, including the pitch diameter and functional diameter, the screw thread measuring device comprising:

a base comprising opposed sides, opposed ends and an upper surface, the upper surface having an opening;

a pair of fixed shafts, parallel to each other, fixedly mounted to the base;

a platform disposed within the opening on the upper surface of the base and slidably mounted to the pair of shafts so that the platform can slide within the opening in the upper surface of the base;

a first measuring segment mounted to the base;

a second measuring segment complementary to the first measuring segment and mounted to the platform in registry with the first measuring segment for measuring a physical property of threaded parts;

a gage mounted to the base;

a connection between the gage and the platform for measuring the movement of the platform with respect to the base; and a reversible biasing device to bias the platform either away from or toward the first measuring segment for selectively measuring physical parameter of either internally or externally threaded parts.

19. A screw thread measuring device according to claim 18 wherein the reversible mounting device is movably mounted to the base and slidably mounted to the platform.

* * * * *